May 13, 1924.

L. A. OSGOOD

SCALE

Filed June 17, 1920

INVENTOR
Louis Ashley Osgood

Kerr Page Cooper & Hayward
ATTORNEYS

May 13, 1924.
L. A. OSGOOD
SCALE
Filed June 17, 1920
1,494,123
2 Sheets-Sheet 2
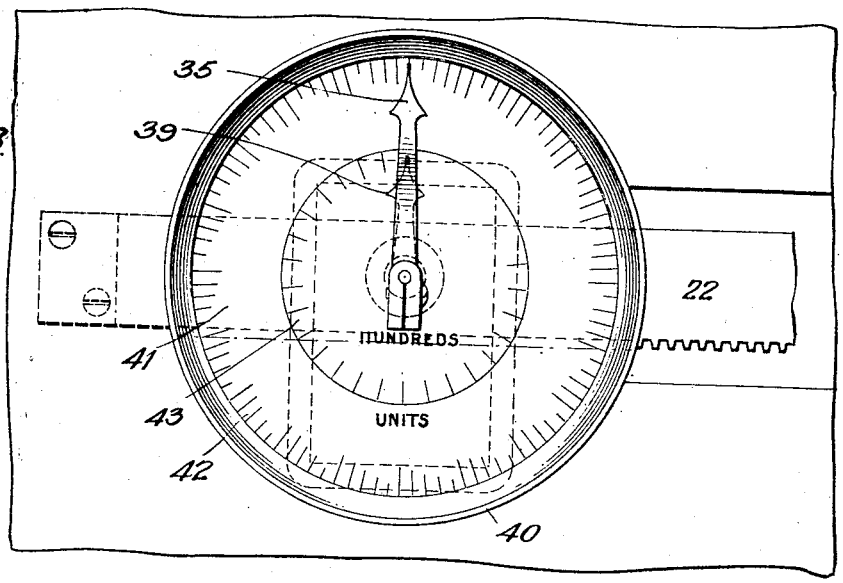
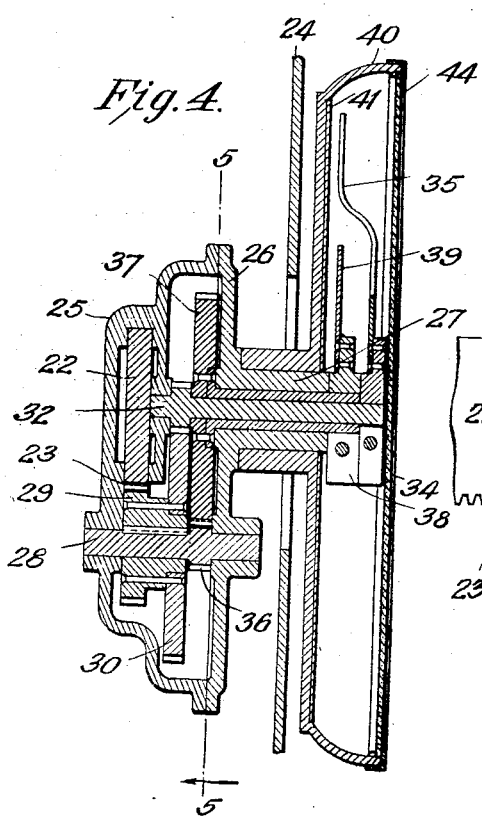
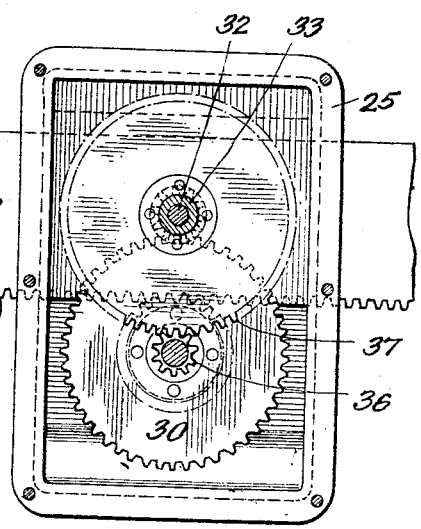
INVENTOR
Louis Ashley Osgood
BY
Kerr Page Cooper & Hayward
ATTORNEYS Patented May 13, 1924.

1,494,123

UNITED STATES PATENT OFFICE.

LOUIS ASHLEY OSGOOD, OF DAYTON, OHIO, ASSIGNOR TO INTERNATIONAL SCALE COMPANY, OF DAYTON, OHIO, A CORPORATION OF ILLINOIS.

SCALE.

Application filed June 17, 1920. Serial No. 389,559.

*To all whom it may concern:*

Be it known that I, LOUIS ASHLEY OSGOOD, being a citizen of the United States, residing at Dayton, in the county of Montgomery and State of Ohio, have invented certain new and useful Improvements in Scales, of which the following is a full, clear, and exact description.

This invention relates to improvements in the scale shown and described in Patent No. 1,198,650, patented by me on September 19, 1916.

The objects of the present invention reside in the provision of a novel means for setting the tare poise and for indicating the amount of tare weight counterbalanced by the poise.

One of the objects of the present invention is to provide a scale in which readings of both weight and tare may be taken from dials instead of from dials and graduated beams. By having all readings on dials the liability of errors in reading are largely minimized.

In the drawings:

Fig. 3 is a front detail view of the tare device.

Fig. 4 is a vertical sectional view of the parts shown in Fig. 3.

Fig. 5 is an additional detail sectional view taken on line 5—5 of Fig. 4.

Figure 1:
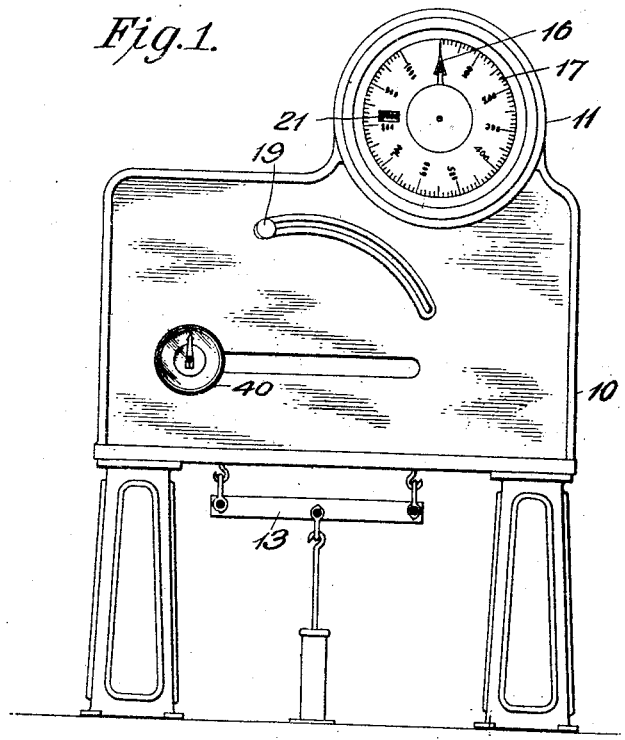
Fig. 1 shows a front view of my improved scale.
Figure 2:
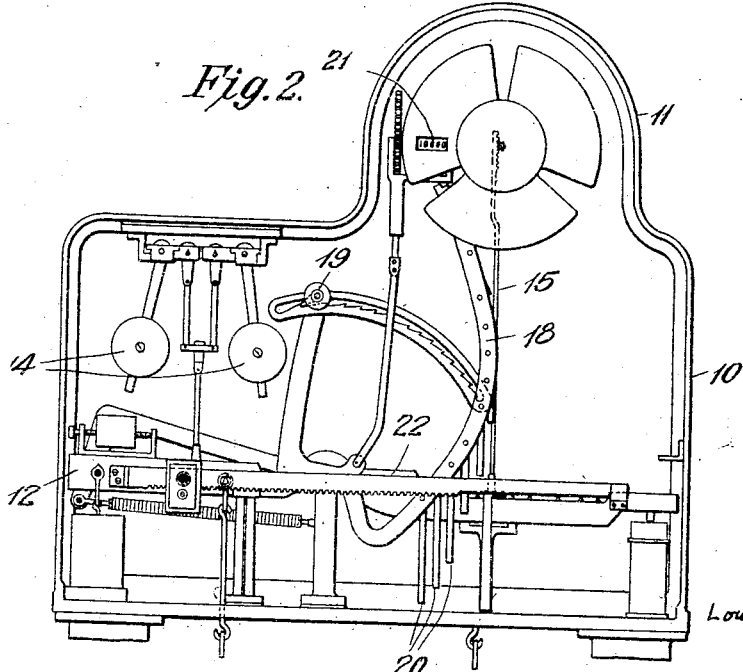
Fig. 2 shows front view with cover plate and weight removed and with parts of the tare device broken away.

The scale comprises a casing 10 having a dial housing 11 thereon. Within the casing is fulcrumed a main scale beam 12. This beam is provided with the usual knife edges supporting a link which, through an intermediate lever 13, connects with a steelyard leading to the base lever system (not shown). The scale beam is connected to a load counterbalancing means comprising a pair of pendulums 14. Also connected to the beam is a rack rod 15 which through a rack and pinion turns an indicator 16 (Fig. 1) to display on dial 17 the amount of the load counterbalanced by the pendulums. A pivoted weight carrier 18 is provided which upon manipulation of the handle 19 is adapted to deposit one or more capacity weights 20 upon the scale beam 12. The amount of the weights so applied is indicated upon a capacity weight dial 21.

Fastened to the main scale beam (preferably by brackets and screws) is a tare beam 22. This beam is provided with rack teeth 23 upon its lower edge and is preferably disposed within the casing at a slight distance from the front casing wall 24 (see Fig. 4).

Referring to Fig. 4, 25 represents a member, preferably a casting, which forms a housing for certain parts of the tare indicating and propelling device. The housing is closed at the open side by means of a cap 26 which has a hollow boss 27 extending through a slot in the front casing wall. Member 25 is suitably shaped to embrace, slide along, and be supported by tare beam 22. Below the tare beam is a shaft or arbor 28 which is rotatably supported in bearings formed in part 25 and cap 26. Keyed to this shaft is a gear pinion 29 which meshes with the rack teeth 23 on tare beam 22. Fastened to rotate in unison with pinion 29 is a large gear 30 which in turn meshes with a small pinion 31 carried by and preferably integral with an arbor 32. This arbor at one end is journaled in the member 25 and the other end extends through a sleeve 33 which is journaled in hollow boss 27. A suitable clamp 34 secures a pointer 35 to the end of the arbor 32.

Adjacent gear 30, the arbor 28 is provided with a small pinion 36 which meshes with a large gear 37 journaled upon arbor 32. This gear is suitably fastened to the end of sleeve 33 so as to rotated the sleeve upon rotation of the gear. Upon the outer end of the sleeve a clamp 38 secures a pointer 39 thereto.

Suitably fastened to boss 27 is a flanged annular casing 40 which supports a disklike member 41 having a plurality of or multiple of sets of graduations. 42 are the units graduations over which the pointer 35 swings and 43 are the hundreds graduations for indicating amounts designated by pointer 39. The casing 40 may be closed in at the front by a glass plate 44 if desired.

When the device is in use the operator grasps the casing 40 and slides the whole poise assembly along the tare beam. The gearing then rotates and turns the pointer hands proportionally to the displacement of the poise assembly. The hundreds pointer gearing has a hundred to one ratio relatively to the units pointer gearing. Therefore, when the units pointer has swept through one complete revolution the hundreds pointer will indicate 1 on dial 43. Inasmuch as the hundreds pointer advances one unit for each revolution of the units pointer hand the dial indication of weight may aptly be termed a clock face indication. The device also provides a ready means for presenting any desired counterbalance upon the scale beam. If a container or containers of known weight are to be used, the operator can rapidly set the poise assembly to the position in which the pointers designate the desired weight on the dials. All readings both of tare and actual weight readings are taken from dials and the chance of errors in reading are largely minimized.

I claim:

1. In combination with a tare beam having rack teeth thereon of a slidable poise assembly, comprising a double gear train adapted to be rotated by said rack upon the sliding of the poise, separate pointers driven by said gear trains, and means provided with multiple sets of graduations over which the separate pointers sweep to indicate the weight counterbalanced by the displaced poise assembly.

2. In combination with a tare beam having rack teeth thereon, of a slidable poise assembly carried thereby and comprising a gear meshing with the rack teeth, a plurality of gear trains of different gear reductions driven by said gear upon the rotation thereof by the displacement of the poise assembly, individual pointers driven by said gear trains, and means having a plurality of sets of graduations over which said pointers are adapted to sweep to indicate in pounds the weight counterbalanced by the displaced poise.

3. An indicating device for indicating the weight counterbalanced by a displaceable poise comprising a tare beam having rack teeth thereon, of a slidable poise assembly carried thereby and comprising a gear meshing with the rack teeth, a plurality of gear trains of different gear reductions driven by said gear upon rotation thereof by the displacement of the poise assembly, pointers associated with said gear trains and variably positioned thereby, and means having concentrically arranged sets of graduations, carried by the poise assembly, over which the pointers sweep to indicate the counterbalanced weight.

4. An indicating device for indicating the weight counterbalanced by a displaceable poise comprising a tare beam having rack teeth thereon, a slidable poise assembly slidable relative to said beam and having gear trains of varying resultant gear ratios driven by said rack upon the relative displacement of the poise assembly and tare beam, and a clock face indicating means driven by said gearing to display the counterbalanced weight.

5. In a weighing scale in combination, a scale beam automatic load-counterbalancing means connected thereto, a dial indicator for displacing the amount of load counterbalanced by said automatic load-counterbalancing means, a tare beam moving in unison with the beam, a slidable poise assembly thereon, and a dial indicating device carried thereby and displaying thereon the amount of the load-counterbalanced by the sliding poise assembly.

6. In a weighing scale in combination, a scale beam, automatic load-counterbalancing means connected thereto, means for applying capacity weights to the scale beam, dial means for indicating the amount of load counterbalanced by the automatic load-counterbalancing means, an indicator for indicating the amount of load counterbalanced by the capacity weights, a tare beam movable in unison with the main scale beam, a slidable poise assembly thereon, and an indicating device carried by said poise assembly for indicating the amount of weight counterbalanced by the sliding poise in its variable position on the beam.

7. An indicating poise adapted to be actuated by rack teeth upon a tare beam, comprising a housing supported upon the beam, a cap therefor, an arbor journaled in said cap and housing below the beam, a gear coacting with the rack teeth on the beam and rotating said arbor upon the displacement of the housing relatively to the beam, a second arbor geared to said first-mentioned arbor, a sleeve-like member also geared to said first-mentioned arbor, and pointers carried by said second arbor and said sleeve adapted to indicate the displacement of the poise relatively to the beam.

8. An indicating poise adapted to indicate the weight counterbalanced by a poise assembly in its various positions of displacement upon a tare beam, comprising a housing supported by and slidable on the beam, a double gear train in said housing, a common gear for driving the said trains, a coaxial arbor and sleeve driven by said gear trains, pointer hands carried by said arbor and sleeve, and concentrically disposed dials over which the pointers sweep.

In testimony whereof I hereunto affix my signature.

LOUIS ASHLEY OSGOOD.